United States Patent [19]

Chi et al.

[11] Patent Number: 5,437,687
[45] Date of Patent: Aug. 1, 1995

[54] WET PROCESS WITH NO HEATING FOR CONTINUOUS TRANSFER PATTERN PRINTING OF A CELLULOSE FABRIC WEB AND ITS BLENDS

[75] Inventors: Wu H. Chi, I-Lan Hsien; Jen-Wei Lin; Rudolf Lee, both of Taipei, all of Taiwan

[73] Assignee: Tofo Enterprise Co., Ltd., Taipei, Taiwan

[21] Appl. No.: 306,441

[22] Filed: Sep. 19, 1994

[51] Int. Cl.[6] .......................... D06P 3/60; D06P 7/00
[52] U.S. Cl. .......................................... 8/467; 8/444; 8/486; 8/487; 8/500; 8/506; 8/561; 8/918; 8/930
[58] Field of Search ............... 8/444, 467, 486, 487, 8/500, 506, 561, 918, 930

[56] References Cited

U.S. PATENT DOCUMENTS

| | | | |
|---|---|---|---|
| 383,272 | 5/1888 | Bensinger | 8/467 |
| 1,783,606 | 12/1930 | Dreyfus | 8/467 |
| 1,797,997 | 3/1931 | Sadtler | 8/467 |
| 1,825,342 | 9/1931 | Dreyfus et al. | 8/467 |
| 1,993,524 | 3/1935 | Pöschel | 8/467 |
| 2,021,418 | 11/1935 | Huggins et al. | 8/467 |
| 2,629,647 | 2/1953 | Pitt | 8/486 |
| 3,844,806 | 10/1974 | Wegmann et al. | 106/193 D |
| 4,265,630 | 5/1981 | Bäuerle | 8/456 |
| 4,820,686 | 4/1989 | Ito et al. | 8/471 |
| 5,094,664 | 3/1992 | Randin et al. | 8/486 |
| 5,153,317 | 10/1992 | Ortega et al. | 8/561 |
| 5,196,030 | 3/1993 | Akerblom et al. | 8/467 |

FOREIGN PATENT DOCUMENTS 8902950  4/1986  WIPO.

*Primary Examiner*—Paul Lieberman
*Assistant Examiner*—Caroline L. Dusheck
*Attorney, Agent, or Firm*—Michael D. Bednarek; Marks & Murase

[57] ABSTRACT

A wet process with no heating for continuous transfer pattern printing of a cellulose fabric web or its blends by using a corona-treated plastic film as a pattern carrier web and a dye admixed with a thickening agent containing water-soluble and alcohol-soluble hydroxypropyl cellulose or polyvinyl pyrrolidone as ink.

16 Claims, 2 Drawing Sheets

WET PROCESS WITH NO HEATING FOR CONTINUOUS TRANSFER PATTERN PRINTING OF A CELLULOSE FABRIC WEB AND ITS BLENDS

TECHNICAL BACKGROUND

The present invention relates to a wet process with no heating for continuous transfer pattern printing of a cellulose fabric web and its blends, and in particular to a wet process with no heating for continuous transfer pattern printing of a cellulose fabric web and its blends by using a corona-treated plastic film as a pattern carrier web and a dye admixed with a thickening agent containing water-soluble and alcohol-soluble hydroxypropyl cellulose or polyvinyl pyrrolidone as ink.

Printing on textile webs can be classified into direct textile printing and indirect textile printing. What is called indirect textile printing is transfer pattern printing. A disadvantage of direct textile printing is that before the patterns are set to their correct positions for printing, a substantial amount of textile web must be used, and the patterns are difficult to set in their correct positions, thereby causing the loss of the textile webs. Another disadvantage of direct textile printing is that manufacturers have to produce quite large supplies of the individual designs, and if the designs of the patterns go out of fashion, the stock of designs will increase. Also, as a plurality of screens are used in direct textile printing, patterns of different color tones, for example, pattern of half color tone can not be obtained.

For transfer pattern printing, however, patterns are first printed on a pattern carrier web, and then transferred to the textile web. Therefore, transfer pattern printing has the advantages over direct textile printing that the loss of textile web is small, and it is possible to obtain a quite sharp transfer of the patterns. Furthermore, as the pattern carrier web is much cheaper than the textile web, if the patterns go out of fashion, this will only cause an increase of the stock of cheap pattern carrier web. Also, by using transfer pattern printing, the users only need equipment for transfer pattern printing, and no investment in a factory, equipment or people for manufacturing plates is needed. In addition, transfer pattern printing utilizes intaglio, thus, only one station can print patterns of different colortones.

U.S. Pat. No. 3,666,397 discloses a transfer printing process wherein a cellulose fabric web is kept in contact, in the wet state, with a support heated to 100° to 106° C. for 0.5 to 220 seconds. The process has the disadvantage that the cellulose fabric should be impregnated with an alkali solution, but this step makes the impregnated cellulose fabric become yellowish in the subsequent heating step, if the heating is too long or is effected at an elevated temperature.

U.S. Pat. No. 5,196,030 discloses a continuous process with no heating for transfer pattern printing. In other words, according to said process, transfer pattern printing on cellulose fabric, such as cotton, can be conducted at a low temperature. However, absorbent paper webs having an air permeability of 0.1 to 3,000 nm/Pa.s as measured according to standard test method SCAN P 26:78 and having a water absorption corresponding to a Cobb number below 50 as measured according to standard test method ISO 535, 1976 must be used as the pattern carrier web. Therefore, the source of such pattern carrier web is not readily available, and thus the process is still not satisfactory. Also, before the absorbent paper webs are printed with a pattern of dyestuff, they must be coated with carboxy methyl cellulose (CMC), an alginate or an aqueous dispersion of polyethylene or polyacrylate. This step also increases the operations and the cost when the process is to be applied in industries. Moreover, water is used as the dissolving solution for the printing paste in the whole process, and this necessitates a higher drying temperature, such as 100° C., because the drying rate of water is relatively lower than that of other organic solvents.

In addition, sublimation transfer printing is a method of printing textile web by using heat and pressure to transfer disperse dyestuff printed on a pattern carrier web to textile webs of synthetic fibers, for example, polyester fibers. French Patent No. 1,223,330(1958) issued to Filature Prouvost-Masurel has disclosed a sublimation transfer printing method for textile webs of polyester fibers. However, as the disperse dyestuffs used for sublimation transfer printing do not have affinity to a cellulose fabric web or its blends, the printed textile webs have poor fastness to washing, daylight or rubbing.

SUMMARY OF THE INVENTION

It is therefore an object of this invention to provide a continuous process with no heating for transfer pattern printing on a cellulose fabric web or its blends to eliminate the above-mentioned disadvantages of prior processes for transfer pattern printing.

In order to attain the above-mentioned object, according to the process of the invention, readily available and cheap plastic films are used as pattern carrier web, and the printing of pattern on the plastic films is conducted by using a dye admixed with a thickening agent which is a water soluble and alcohol soluble hydroxy propyl cellulose or polyvinyl pyrrolidone as ink.

According to an aspect of the invention, the plastic film is corona-treated prior to being printed with pattern of dyes of the invention so that the dyes can be temporarily adhered thereto firmly.

According to another aspect of the invention, the plastic films can be laminated with a paper web, prior to corona treatment, to form a laminate to reduce costs.

According to a further aspect of the invention, the dye and thickening agent are formulated into printing paste by using an aqueous solution of alcohol.

According to a further aspect of the invention, the process of the invention can be used not only for transfer pattern printing on a cellulose fabric web, but also on its blends.

Specifically, according to the present invention, the process includes: (a) pre-printing a pattern with a dye admixed with hydroxy propyl cellulose or polyvinyl pyrrolidone as a thickening agent, a solvent, and antireduction agent on the printing surface of a corona-treated plastic film; (b) soaking the cellulose fabric web or its blends in an alkali solution and squeezing the wetted cellulose fabric web to reduce the moisture content to 30–60%; and (c) transferring the pattern from the printing surface of the plastic film to the soaked cellulose fabric web or its blends without heating.

As according to the process of the invention, cheap, readily available plastic films are used as the pattern carrier web, therefore the cost of transfer pattern printing is reduced. Also, as the plastic films have been corona treated, therefore sharp and finely detailed transfer of the pattern is obtained. Moreover, as the printing ink contains hydroxy propyl cellulose or polyvinyl pyrrolidone which has low viscosity, i.e. good flowability, and is both water and alcohol soluble, and the solvent for the printing ink is an aqueous solution of alcohol which has low volatility, the transfer patter printing can be effected in an efficient way. Furthermore, the process is also energy saving as no heating is required for the pattern transfer.

BRIEF DESCRIPTION OF THE DRAWINGS

The present invention can be more fully understood by reference to the following detailed description and accompanying drawings, which form the integral part of this application, and wherein.

DETAILED DESCRIPTION OF THE PREFERRED EMBODIMENT

Figure 1:
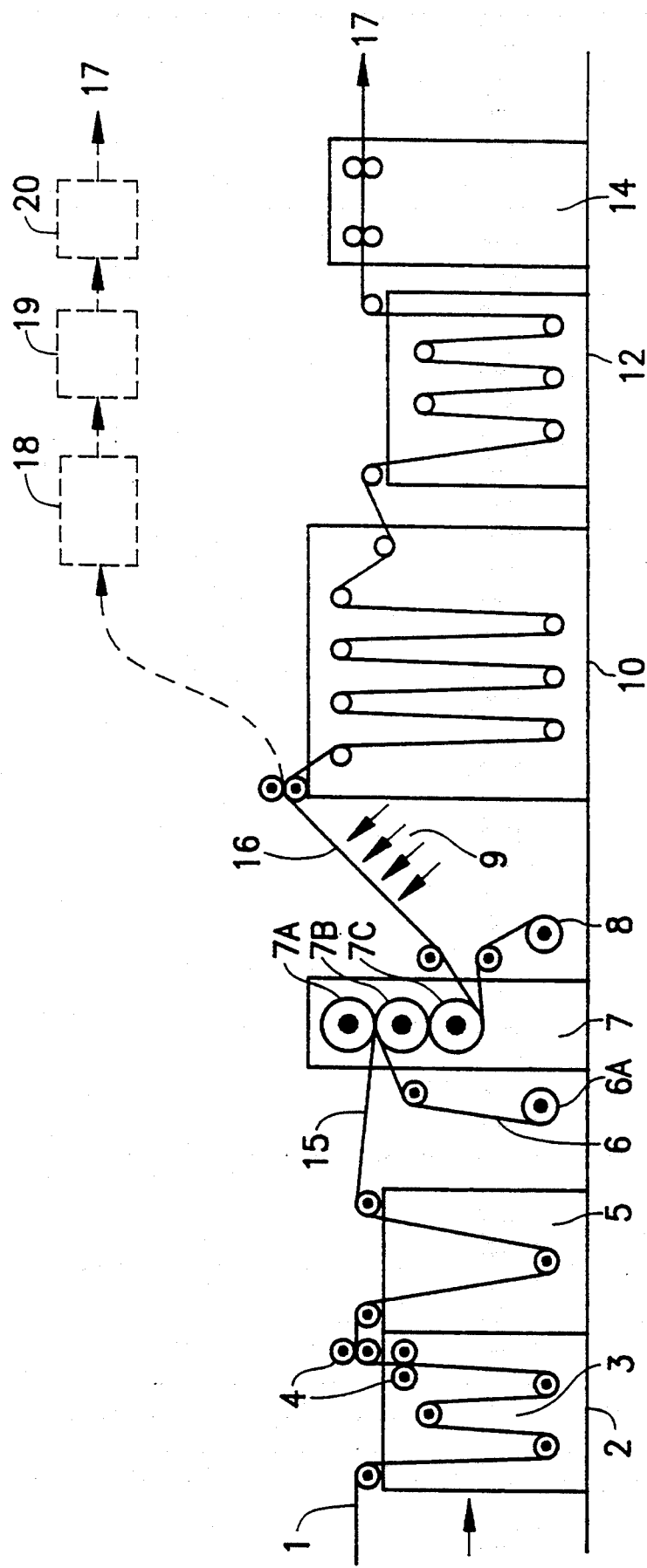
FIG. 1 is an outline of a complete apparatus for performing the process of the invention.

Examples of cellulose fabric webs which may be subjected to the transfer pattern printing by the process of the invention include cotton, rayon or cellulose fabric consisting of from 100% to 20% of cotton and from 0% to 80% of synthetic fibers.

The cellulose fabric webs prior to pattern transfer printing, according to the present process, must be soaked in an alkali solution and squeezed to reduce the moisture content to 30-60%. The alkali solution may be, for example, a solution of sodium carbonate or sodium hydroxide. Urea may be added in the alkali solution to increase the permeability of dye on the cellulose fabric. Alginate may also be added in the alkali solution to increase the viscosity of the solution.

According to the process of the invention, the best material for use as plastic film is polytetraphthalate (PET), or known as Mylar (trade name). The plastic film can also be made from other materials such as polyvinyl chloride (PVC), polypropylene (PP), polyethylene (PE), and nylon. These materials are readily available, low in cost, and plentiful in supply. In addition, to save the cost of the plastic film, it is also possible to use a laminate of plastic film web and paper web as the pattern carrier web. The plastic film can be laminated on the paper web by adhesives or by continuous cascading molten plastics coming from an extruder on a moving paper web to form a laminate. A laminate made by adhering PET film to a paper web with adhesives and a laminate made by cascading molten PE on a moving paper web are the preferred pattern carrier webs according to the process of the invention. The corona treatment can be applied either prior to the lamination or after the lamination.

As the thickening agents used according to the process of the invention, hydroxy propyl cellulose (HPC), and polyvinyl pyrrolidone(PVP), are both water and alcohol soluble, aqueous solution of alcohol is therefore can be used as solvent when formulating the printing ink. Among the alcohols, ethanol is preferred, although methanol, isopropyl alcohol or butanol may also be used.

In addition to HPC and PVP, an anti-reduction agent such as metanitrobenzene sulfonate sold under the trade name, Ludigol (BASF, Germany) may be added in the printing ink to increase the stability of printing ink on the pattern carrier web, i.e. the plastic film. To avoid impurities contained in hard water, such as iron, magnesium reacting with the reactive dye thereby reducing the brightness of dye, it is desirable to use deionized water when the printing ink is formulated.

According to the process of the invention, if the fabric web to be printed is cotton or rayon, the dyestuff suitable for use can be reactive dye or direct dye. If direct dye is used, the fabric web, after being transfer pattern printing, must be fixed with fixing agent. It is therefore preferred to use reactive dye for the transfer pattern printing of cotton and rayon. If the blends of cellulose fabric web are to be transfer pattern printed, according to the process of the invention, a mixture of reactive dye and disperse dye is used. The ratio of the reactive dye and the disperse dye should be adjusted by referring to the content of the synthetic fibers in the blend. Also, preferably, an anti-alkaline type disperse dye is used when a blended cellulose fabric web is to be printed. When a mixture of dyes is used to print blended cellulose fabric web, the subsequent steam-fixing conditions should be 175° C. for about 6 minutes.

Now referring to FIG. 1 which shows an outline of the apparatus for performing the process of the invention, a cellulose fabric web 1 of cotton is first introduced in an alkali solution treating apparatus 2 in which the web 1 is immersed in alkali solution bath 3, which contains alginate, deionized water, base such as sodium carbonate, and urea. When the cotton web 1 passes through squeezing rollers 4, so much water is squeezed out of it. The wet web 1 is then introduced in a moisture control station 5 for further controlling the moisture in the range of 30 to 60%. The moisture controlled web, now designated as 15, after coming out of the moisture control station 5, is then joined with the printed pattern carrier web 6 which is unwound from the roller 6A, and the joined webs pass through sets of pressure rollers, 7A, 7B and 7C in the transfer region 7. The rollers 7A, 7B and 7C each exert a linear pressure of at least 5 kg/cm$^2$. The moisture controlled and already transferred textile web, now designated as 16, after passing the roller 7C, is then dried by hot air 9 and then introduced to a steam-fixing device 10 in which saturated steam at a temperature of 101° C. to 103° C. is applied to the textile web 16 for 6 to 15 minutes so that the reactive dye, the alkali, and water containing cellulose fabric are caused to react, thereby fixing the dye on the textile web 16. The used pattern carrier web 6, after passing through the roller 7C, is wound by roller 8. The textile web 16 is then introduced to a washing device 12 in which the web 16 is washed to remove the residual dye, thickening agent, urea, anti-reduction agent, and alkalis. The textile web 16 thereafter continues through a drying and post-treatment device 14 in which the web is dried and post treated to obtain the finished web product 17.

The printed textile web 16 can also be steam-fixed, washed and post-treated in a batchwise manner. For example, the web 16 is first introduced in a steam-fixing device 18 in which it is reacted with steam at a temperature of 101° C. to 103° C. for 6-15 minutes or at a temperature of 140°-180° C. for 3-5 minutes by hot air, and then introduced to a washing device 19 for washing and finally introduced to a post-treatment station 20 to obtain the finished product 17.

Figure 2:
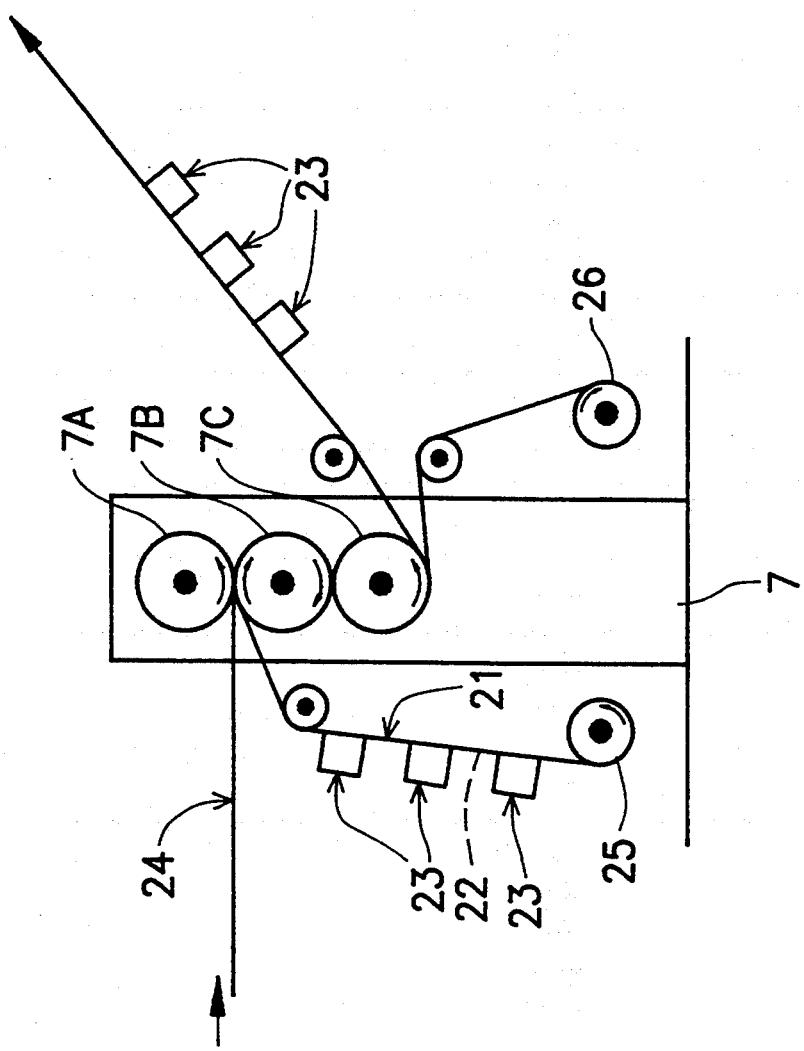
FIG. 2 is a section showing in detail how the transfer pattern printing is carried out by three squeezing rollers.

FIG. 2 illustrates in more detail how the pattern on the pattern carrier web 21 is transferred to the moistened cotton web 24 by the pressure rollers 7A, 7B and 7C in the transfer region 7. A coating 23 of the ink is shown printed on the the corona-treated surface 22 of the carrier web 21, a film of Mylar. The coating 23 and the moistened cotton web 24 are together compressed between the rollers 7A, 7B, first, and then rollers 7B, 7C so that the coating 23 is pressed onto the surface of the cotton web 24. The linear pressure exerted by the rollers 7A, 7B and 7C is at least 5 Kg/cm². The cotton web 24 pass through the rollers 7A, 7B and 7C with a velocity of 1000 m/hr.

The process of the invention is more specifically described by the following illustrative examples.

EXAMPLE 1

In this example, transfer printing was performed with pre-bleached mercerized cotton knits weighing approximately 200 g/m². A printing paste having the following composition was first formulated.

|  | Blue | Red | Yellow |
|---|---|---|---|
| (1) Levafix Brilliant Blue PN-RL(Bayer) | 80 g | | |
| Levafix Red PN-FB (Bayer) | | 80 g | |
| Levafix Golden Yellow PN-GR(Bayer) | | | 80 g |
| (2) deionized water | 320 g | 320 g | 320 g |
| (3) Ludigol (BASF) | 10 g | 10 g | 10 g |
| (4) HPC in ethanol (6% solid) | 590 g | 590 g | 590 g |
| Total | 1000 g | 1000 g | 1000 g |

The printing paste was then applied to a corona-treated Mylar film in an arbitary pattern at a thickness of 36 μ.

Prior to the pattern transfer, the cotton knits were treated with an alkali solution. The composition of the alkali solution is as follows:

| 1. alginate | 10 g |
|---|---|
| 2. deionized water | 925 g |
| 3. sodium carbonate | 15 g |
| 4. urea | 50 g |
| Total | 1000 g |

The alkali solution-treated cotton knit was then squeezed by the apparatus as shown in FIG. 1 to contain 30% to 60% moisture. The cotton knit thus wetted and the printed pattern carrier Mylar film were then joined and compressed by rollers 7A, 7B, and 7C at a linear pressure of at least 5 Kg/cm² so that the pattern on the pattern carrier Mylar film was transferred to the cotton knit. After the cotton knit and the Mylar film were separated, the former was dried by hot air and introduced to the steam-fixing device for treatment with saturated steam at 101° C. to 103° C. for 6 to 15 minutes during which the dye is fixed. Residual dye, thickening agent and base were then removed in a washing tank. After drying and post-treatment, cotton knits with transferred pattern were obtained. The coloring of the cotton knits was fine and with sharp contours.

EXAMPLE 2

The same procedures and materials as in Example 1 were used, except that a corona-treated plastic film laminated on a paper web was used as pattern carrier web. The laminate was made by adhering a corona-treated PET film of 12 μm on a simili paper of 60 lbs/m². The same result as in Example 1 was obtained.

EXAMPLE 3

The same procedures and materials as in Example 1 were used, except that a corona-treated plastic film laminated on a paper web was used as pattern carrier web. The laminate was made by cascading a molten PE film of 20 μm on a simili paper of 60 lbs/m². The same result as in Example 1 was obtained.

EXAMPLE 4

In this example, transfer pattern printing was performed with an union fabric of cotton/polyester in the ratio of 50:50, weighing 120 g per square meter. A printing paste having the following composition was first formulated.

| (1) Levafix Brilliant Blue PN-RL (Bayer, Reactive dye) | 60 g |
|---|---|
| Resolin Blue FR (Bayer, disperse dye) | 60 g |
| (2) HPC solution, 10% solids | 300 9 |
| (3) deionized water | 570 g |
| (4) Ludigol (BASF) | 10 g |
| Total | 1000 g |

The printing paste was then applied to a corona-treated laminated PE film on paper in an arbitary pattern at a thickness of 36μ.

Prior to the pattern transfer, the union fabric was treated with an alkali solution. The composition of the alkali solution is as follows:

| 1. alginate | 10 g |
|---|---|
| 2. deionized water | 925 g |
| 3. sodium carbonate | 15 g |
| 4. urea | 50 g |
| Total | 1000 g |

The alkali solution treated union fabric was then squeezed by the apparatus as shown in FIG. 1 to contain 60% moisture. The cotton knit thus wetted and the printed pattern carrier laminate were then joined and compressed by rollers 7A, 7B, and 7C at a linear pressure of at least 5 Kg/cm² so that the pattern on the pattern carrier laminate was transferred to the union fabric. After the union fabric and the laminate were separated, the former was dried by hot air and introduced to the steam-fixing device for treatment with steam at 175° C. for 6 minutes during which the dye is fixed. Residual dye, thickening agent and base were then removed in a washing tank. After drying and post-treatment, union fabric with transferred pattern was obtained. The printed union fabric was tested and found to have good fastness to washing, daylight and rubbing.

What is claimed is:

1. A continuous process for transfer pattern printing on a cellulose fabric web and its blends, comprising the steps of:

(a) pre-printing a pattern with a dye admixed with a water-soluble and alcohol-soluble hydroxy propyl cellulose or polyvinyl pyrrolidone as a thickening agent, a solvent, and an anti-reduction agent on a printing surface of a corona-treated plastic film or a corona-treated plastic film laminated on a paper web;

(b) soaking the cellulose fabric web or its blends in an alkali solution and squeezing the soaked cellulose fabric web or its blends to reduce the moisture content to 30–60%; and (c) transferring the pattern from the printing surface of the plastic film to the soaked cellulose fabric web or its blends without heating.

2. The continuous process as claimed in claim 1, wherein said solvent is an aqueous solution of alcohol.

3. The continuous process as claimed in claim 1, wherein said plastic film is made by a material selected from the group consisting of polytetraphthalate (PET), polyvinyl chloride (PVC), polypropylene (PP), polyethylene (PE) and nylon.

4. The continuous process as claimed in claim 1, wherein said plastic film is made of polytetraphthalate.

5. The continuous process as claimed in claim 1, wherein said plastic film laminated on paper web is a laminate made by bonding a PET film on a paper web by adhesives.

6. The continuous process as claimed in claim 1, wherein said plastic film laminated on paper web is a laminate made by cascading molten PE on a moving paper web.

7. The continuous process as claimed in claim 1, wherein said thickening agent is hydroxy propyl cellulose dissolved in a solution of water and ethanol.

8. The continuous process as claimed in claim 1, wherein said thickening agent is hydroxy propyl cellulose dissolved in a solution of water and isopropyl alcohol.

9. The continuous process as claimed in claim 1, wherein said thickening agent is hydroxy propyl cellulose dissolved in a solution of water and methanol.

10. The continuous process as claimed in claim 1, wherein said thickening agent is hydroxy propyl cellulose dissolved in a solution of water and butanol.

11. The continuous process as claimed in claim 1, wherein the solvent comprises deionized water.

12. The continuous process as claimed in claim 1, wherein said cellulose fabric is cotton.

13. The continuous process as claimed in claim 1, wherein said cellulose fabric is rayon.

14. The continuous process as claimed in claim 1, wherein said blends consists of 100–20% of cellulose and 0–80% of synthetic fibers.

15. The continuous process as claimed in claim 1, wherein the alkali solution contains deionized water, sodium alginate, sodium carbonate, and urea.

16. The continuous process as claimed in claim 1, wherein in step (c) transferring the pattern is carried out by compression of the plastic film and the soaked cellulose fabric web between one or more pairs of rollers under a pressure above 5 kg/cm$^2$ without heating.

* * * * *